E. B. BROWN.
VEHICLE TIRE.
APPLICATION FILED OCT. 25, 1917. RENEWED JUNE 16, 1920.
1,347,679. Patented July 27, 1920.
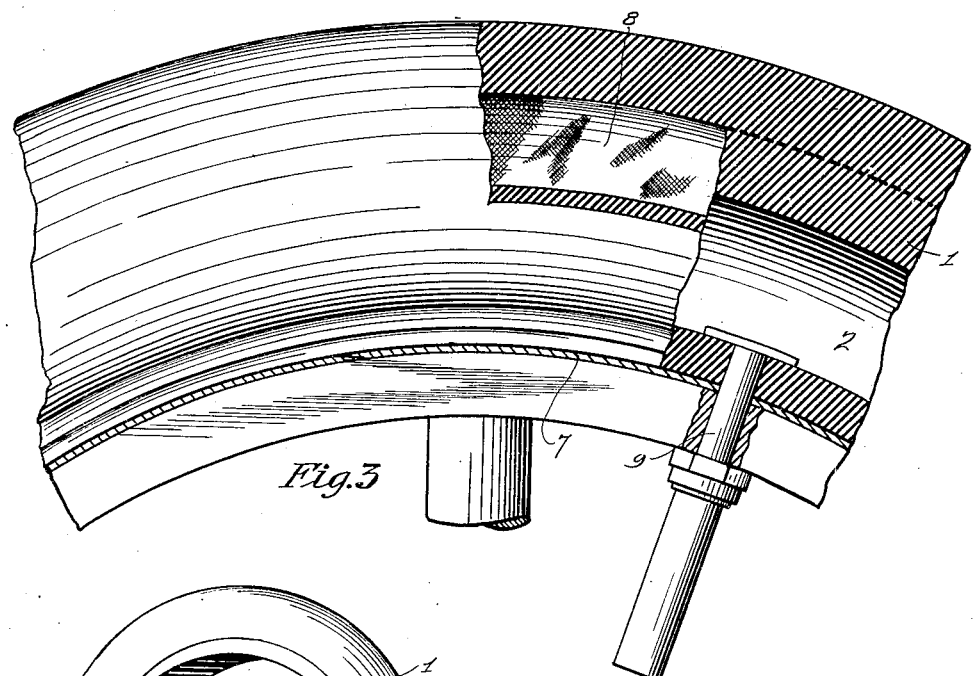
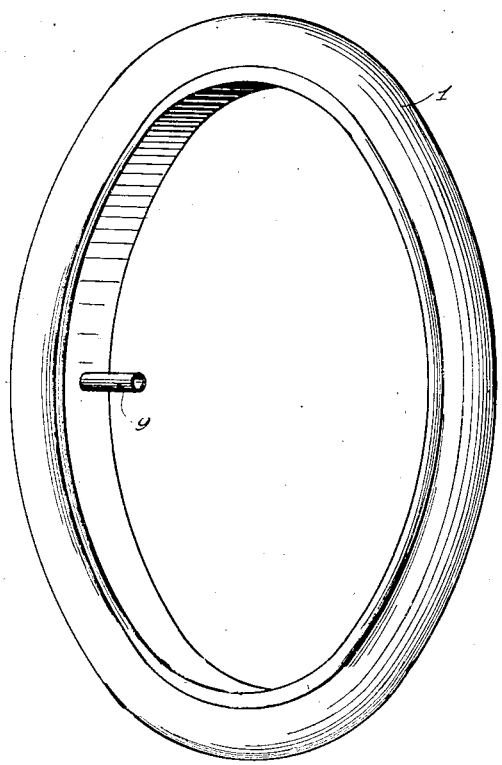
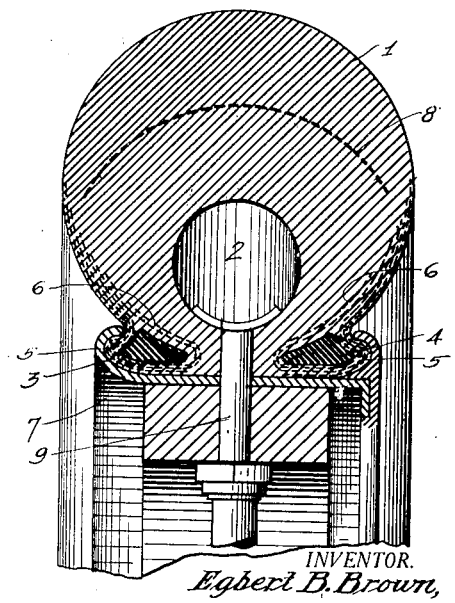
INVENTOR.
Egbert B. Brown,
BY
ATTORNEY.

UNITED STATES PATENT OFFICE.

EGBERT B. BROWN, OF LOS ANGELES, CALIFORNIA, ASSIGNOR TO O. W. FOOT AND H. R. TAYLOR, BOTH OF LOS ANGELES, CALIFORNIA.

VEHICLE-TIRE.

1,347,679.

Specification of Letters Patent.

Patented July 27, 1920.

Application filed October 25, 1917, Serial No. 198,431. Renewed June 16, 1920. Serial No. 389,463.

*To all whom it may concern:*

Be it known that I, EGBERT B. BROWN, a citizen of the United States, residing in the city of Los Angeles, county of Los Angeles, and State of California, have invented certain new and useful Improvements in Vehicle-Tires, of which the following is a specification.

The principal object of my invention is to provide an improved vehicle tire which will embody all of the advantages of the pneumatic and cushion tires, which will be puncture proof, and, at the same time, be free of the other objections found in such tires.

Instead of building up a tire casing with the usual fabric inner lining, I have provided an integral tire body, made of a high grade of rubber, or its equivalent, with an air chamber formed therein, as distinguished from a removable inner tube surrounded by an outer casing which is open at its inner side. I prefer to mold my tire with the air chamber eccentrically positioned therein, in cross section. In forming attaching means for securing the tire upon a wheel rim, two insert ring members are molded into the opposite sides of the inner face of the tire body, and around these insert rings, I prefer to place reinforcements, whereby to strengthen the tire at the rim beads, said reinforcements terminating in the sides of the tire body.

In order to strengthen the tire body, especially against circumferential expansion, I have shown a layer of fabric molded therein, intermediate the outer periphery thereof and the air chamber formed therein, said layer of fabric extending circumferentially around the tire and through the same from near one side thereof to the other.

By eliminating the outer casing with fabric lining, and constructing an integral tire body of high grade rubber, or the like, I eliminate the serious objection of the fabric inner lining hardening and breaking, which is so common after a tire has been used for a time, thus rendering the tire worthless for retreading. When the tread portion of my improved tire body has been worn down, it can be retreaded in a practical and successful manner, and be as good as new, for the reason that the new tread portion is of the same material of which the tire body proper is made.

I have illustrated one practical embodiment of my invention in the accompanying sheet of drawings, which I will now describe.

Figure 1 is a perspective view of one of my improved tires;

Fig. 2 is a cross sectional view through one of my tires, mounted on a wheel rim, also shown in section; and Fig. 3 is a fragmentary side elevation of my improved tire, with parts shown in section and broken out.

Referring now more in detail to the drawings, my improved tire body 1, is made of a high grade of rubber, or its equivalent, and has formed therein a closed air chamber, 2. Molded into the inner side of the tire body, at the opposite sides thereof, are two bead ring inserts, 3 and 4, around which I prefer to place, vulcanized into the body of the tire, fabric reinforcements, three plies being shown at 5, around the outside of said bead ring inserts, and two plies being shown at 6, on the inside of said bead ring inserts, said fabric reinforcements extending upwardly at the opposite sides of the tire a short distance in the body thereof, substantially as indicated, the different layers terminating at different heights at their upper edges. These reinforcements form an efficient anchorage for the tire at the wheel rim.

It will be noted that the air chamber 2 is spaced inwardly a distance from the rim engaging portion or beads of the tire body, so that the chamber is wholly surrounded by a relatively thick portion of the body of the tire.

As shown in Fig. 2, my tire is mounted on a wheel rim 7, the bead inserts, 3 and 4, forming the holding beads on the inner face of the tire body.

Referring to Figs. 2 and 3, I have shown an intermediate layer of reinforcing fabric, 8, extended wholly around the tire body, circumferentially thereof, and of a width sufficient to extend from one side of the tire through the other, but preferably stopping short of the outer surface of the tire body. I have also molded into the body of the tire, an air tube, 9, by means of which air under pressure can be supplied to the air chamber, 2, formed in the body of the tire.

I am aware that changes in the details of construction and arrangement can be made in my tire as here shown for purposes of illustration, without departing from the spirit thereof, and I do not, therefore, limit my tire to the showing here made, except as I may be limited by the hereto appended claim.

I claim:

A vehicle tire of the character referred to consisting of an endless tire body having therein an endless, closed air chamber, and an inflating tube through the body of said tire for filling said air chamber, said air chamber being formed in said body without a separate inner tube, said tire body having formed integrally therewith attaching beads around its inner periphery, said air chamber being spaced from the rim engaging portion of said tire body, the size of said air chamber in diameter, in cross section of said tire body, relative to the cross sectional diameter of said tire body, being such that the walls formed by said body at opposite sides of said air chamber are sufficiently heavy to withstand air pressure within said chamber without outside rims for embracing the opposite sides of said tire, substantially as shown.

Signed at Los Angeles, Los Angeles county, California, this 20th day of October, 1917.

EGBERT B. BROWN.

In presence of—
  Geo. W. Parsons,
  W. R. Litzenberg.